United States Patent [19]

Bunyan

[11] 4,380,181
[45] Apr. 19, 1983

[54] STUD MANIPULATING DEVICE

[75] Inventor: Thomas W. Bunyan, London, England

[73] Assignee: Pilgrim Engineering Developments Limited, Essex, England

[21] Appl. No.: 193,189

[22] PCT Filed: Oct. 3, 1979

[86] PCT No.: PCT/GB79/00161

§ 371 Date: Jun. 3, 1980

§ 102(e) Date: May 14, 1980

[87] PCT Pub. No.: WO80/00672

PCT Pub. Date: Apr. 17, 1980

[30] Foreign Application Priority Data

Oct. 3, 1978 [GB] United Kingdom ............... 39129/78

[51] Int. Cl.³ .............................................. B25B 29/02
[52] U.S. Cl. ..................................................... 81/57.38
[58] Field of Search .......................................... 81/57.38

[56] References Cited

U.S. PATENT DOCUMENTS

| | | | |
|---|---|---|---|
| 3,844,533 | 10/1974 | Markiewicz et al. | 81/57.38 |
| 3,877,326 | 4/1975 | Kock et al. | 81/57.38 |
| 4,020,720 | 5/1977 | Fujii | 81/57.38 |
| 4,047,456 | 9/1977 | Scholz | 81/57.38 |
| 4,273,011 | 6/1981 | Exner et al. | 81/57.38 |

Primary Examiner—James L. Jones, Jr.
Attorney, Agent, or Firm—Woodcock, Washburn, Kurtz, Mackiewicz & Norris

[57] ABSTRACT

A device for inserting and removing studs 16 from bores 19 in a workpiece, for example a nuclear reactor vessel, comprises manipulating devices 22 for operating on individual studs. Each device 22 is capable of tensioning a stud 16, slackening a working nut 17 on the stud, and subsequently removing the stud from the bore. A ring 92 has dogs 93 which can engage recesses in the working nut to interlock with the nut against relative rotation. Motors 100 are coupled to the ring 92 and operable to rotate the working nut. A top nut 51 is coupled to motor 100 which are operable to rotate the nut and screw it onto the stud 16. The top nut 51 together with other operating parts of the device can be raised and lowered on a tube 61 by means of a hydraulic actuator 65. A hydraulic load cell 52 is located between the top nut and a stool 53 which rests on the workpiece. The load cell 52 can be pressurized to tension the stud 16 by means of the top nut 51 and thus facilitate rotation of the working nut 17 when tightening or slackening. A dog clutch mechanism 26 provides means for engaging an end fitting 25 on the stud and locking it against relative axial and rotational movement. The dog clutch mechanism can be raised and lowered on a guide member 36 by an actuator 38. The dog clutch mechanism has a tubular member 42 and the drive coupling for the motor 100 to the top nut 51 includes a tubular member 61. Both of the tubular members 42 and 61 carry teeth 43 and 85 which are engagable with one another to provide a clutch. The teeth 43 and 85 are engaged when the top nut 51 is raised and the dog clutch mechanism 26 is lowered, to provide a coupling between the motors 100 and the dog clutch mechanism for rotating the stud.

6 Claims, 21 Drawing Figures

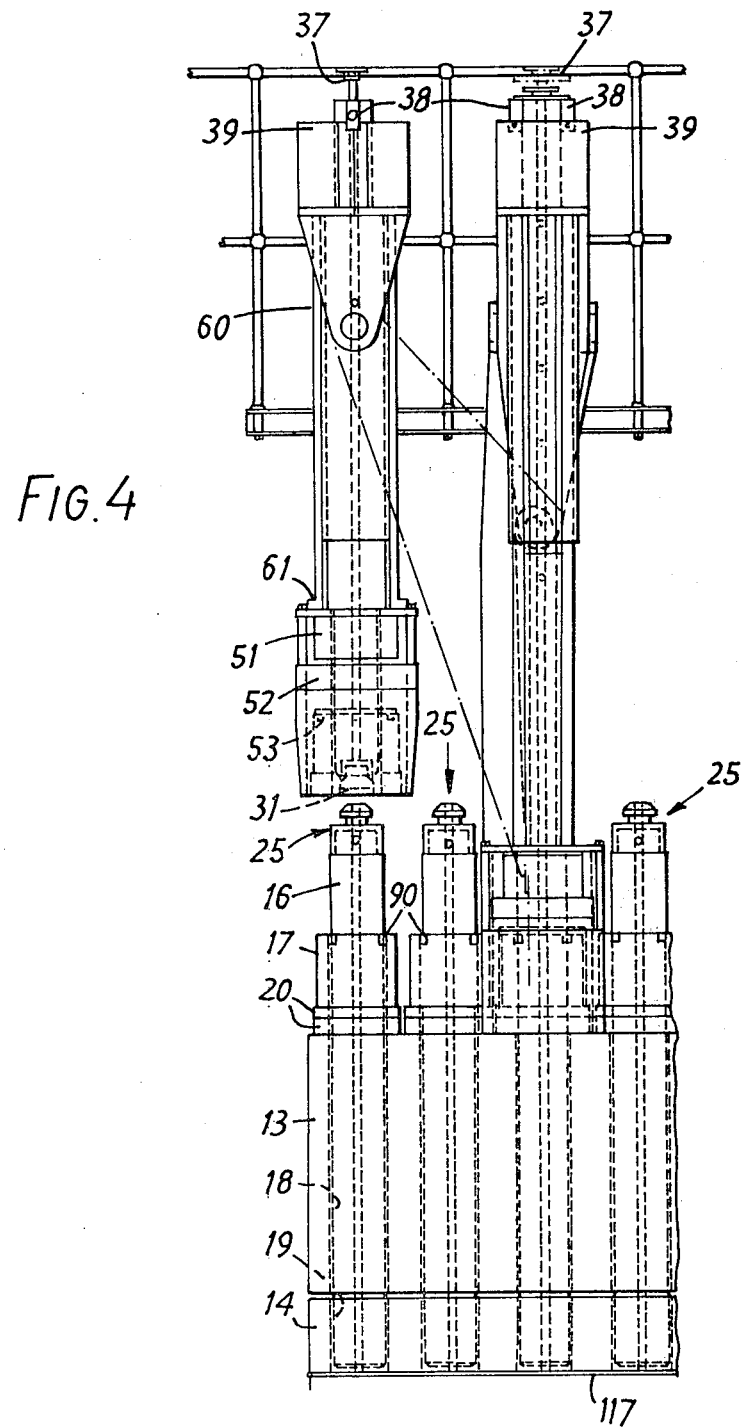

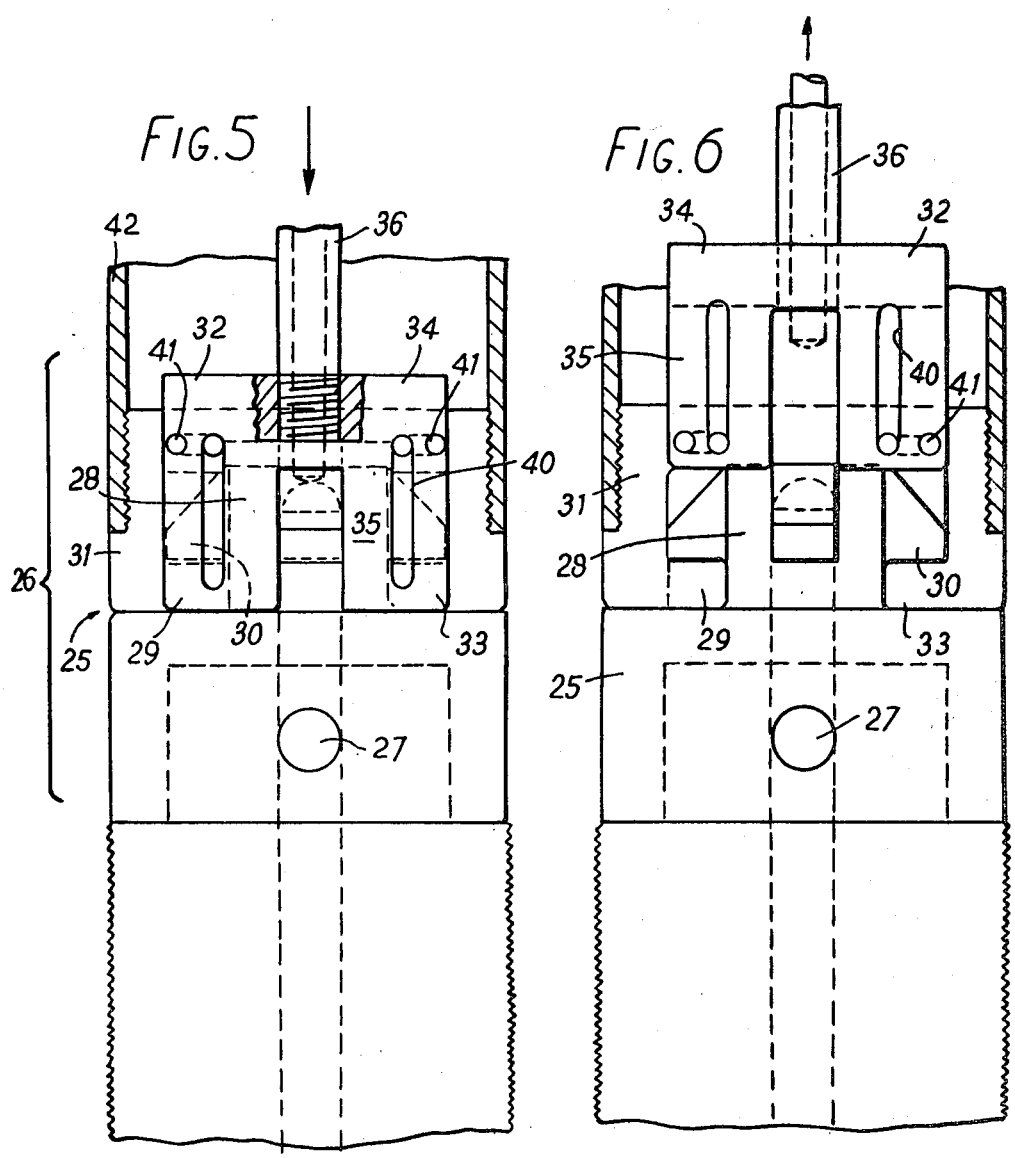

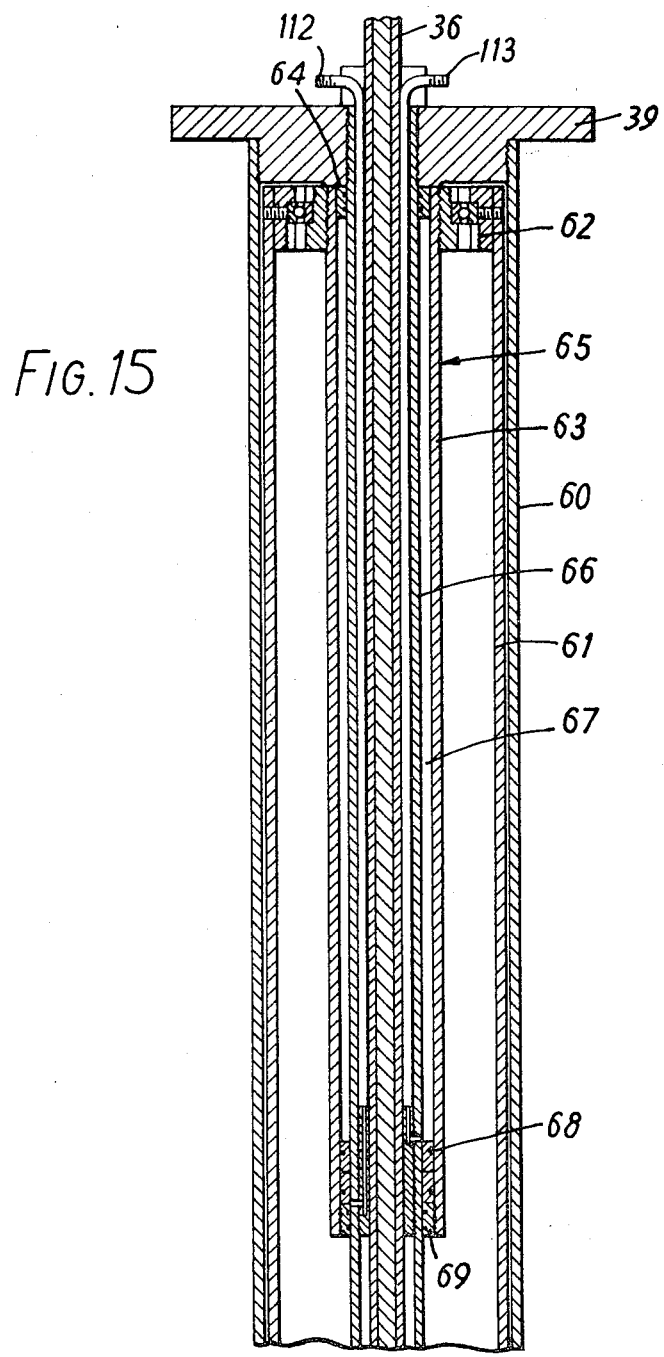

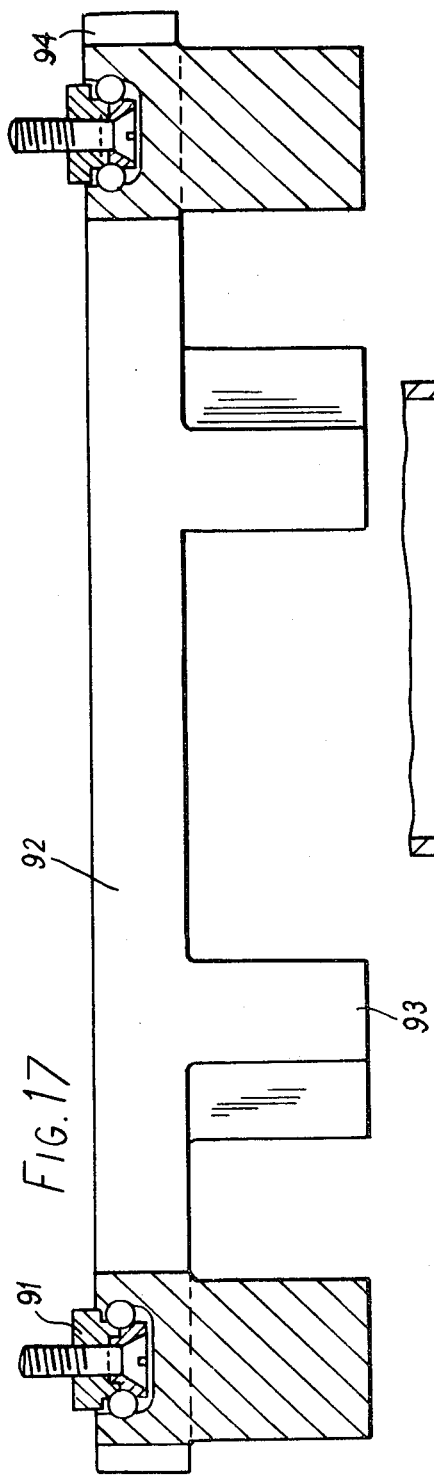

STUD MANIPULATING DEVICE

The present invention is concerned with a device for use in inserting, tensioning and removing screw-threaded studs. It is concerned particularly for use in inserting and removing the studs which hold together atomic pressure vessels but other applications of the device are possible.

In an atomic pressure vessel the cover is usually held in place by means of closely spaced screw-threaded studs which are inserted into screw-threaded bores in a flange around the top of the body of the atomic pressure vessel. The studs pass through bores in the periphery of the cover which is placed over the body and the cover is clamped in place by tightening working nuts onto the exposed ends of the studs. In the past the studs and nuts have been inserted and removed with the aid of hand held power tools by workmen working directly on top of the cover. Each stud is inserted and each nut tightened individually. Because of the level of radiation at the cover and the time needed to fit all the stud and nuts each workman may be exposed to the full yearly dose of radiation which regulations permit, during one operation.

More recently multiple stud tensioning devices have been designed which can operate on several studs simultaneously, tensioning the studs and tightening or slackening the working nut as required. Separate multiple stud removing devices have also been designed which, once the working nuts have been removed can remove several studs from their respective screw-threaded bores simultaneously.

The present invention provides a device which can insert a stud into a bore, tension the studs, tighten a working nut on the stud, slacken the working nut on the stud and remove the stud from the bore. In its preferred form the invention provides several such devices which can be operated simultaneously.

According to the present invention there is provided a stud manipulating device for inserting a stud into a bore in a workpiece, tensioning the stud, tightening a working nut on the stud, or for slackening the nut on the stud and removing the stud from the workpiece, the device comprising means for engaging the working nut and interlocking with the nut against relative rotational movement, first drive means coupled to the working nut engaging means and operable in use to rotate the working nut, a top nut for securing onto the end of the stud, second drive means operable to rotate the top nut, means for raising and lowering the top nut, a hydraulic pressure member located between the top nut and the workpiece and operable to tension the stud by means of the top nut, stud engaging means engagable with the stud to interlock with the stud against relative rotational movement, means for raising and lowering the stud-engaging means, and clutch means operable between the second drive means and the stud engaging means and which is engaged when the top nut is in a raised position and the stud-engaging means is in a lowered position, to couple the stud engaging means in rotation with the second drive means.

To remove a stud using this device the stud engaging means is engaged with the end of the stud. The stud may have a specially formed end part for interlocking with the stud engaging means. The top nut is lowered to the stud and rotated by the second drive means to screw it on the end of the stud. The hydraulic pressure member is pressurised to raise the top nut and thus tension the stud. With the stud tensioned the working nut is unscrewed using the first drive means. The tension in the stud is released by releasing the pressure in the hydraulic pressure member and the top nut is unscrewed from the stud and raised until the clutch means engage. The second drive means are then operated to unscrew the stud from its bore.

To insert a stud, tension it and tighten the working nut the operation is performed in reverse.

In the preferred form of the invention several such devices are provided and their drive means and raising and lowering means interconnected for operation in unison.

We have also invented a method of preventing water entering the bores for the studs when the reactor vessel is flooded following removal of the stud.

The invention also provides a method for preventing water entering bores in a nuclear reactor vessel when studs are removed from the vessel and the vessel is flooded with water comprising filling the bores with a quiescent non-corrosive liquid that is immiscible with water and has a specific gravity greater than water, to a level just below the tops of the bores.

An embodiment of the invention will now be described by way of example with reference to the accompanying drawings of which:

FIG. 4 shows an enlarged elevation of two manipulating devices of the device of FIGS. 1 to 3.

FIG. 5 is a view, partly in section on an enlarged scale of a stud-engaging means of a manipulating device as shown in FIG. 4, in the locking position;

FIG. 6 is a view similar to FIG. 5 but with the parts shown during unlocking;

FIG. 15 shows in vertical section the telescopic guide tube and means for raising and lowering the lower part of the manipulating device of FIG. 4;

FIG. 16 shows in vertical section the top nut of the manipulating device of FIG. 4;

FIG. 17 shows in vertical section the working nut engaging means;

Figure 1:
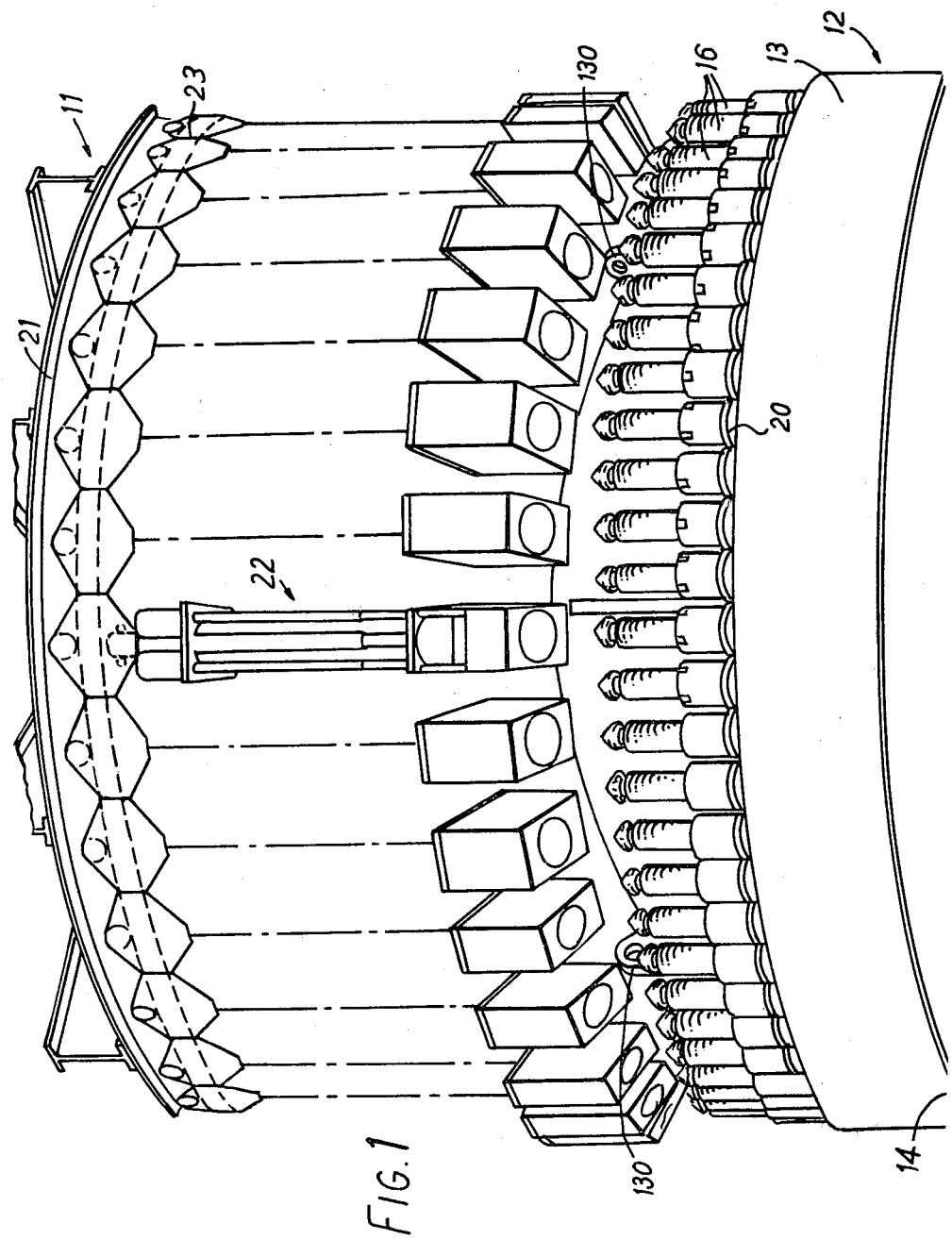
FIG. 1 shows a perspective view of a multiple stud fastening, tensioning and unfastening device according to the invention above an atomic reactor vessel.
Figure 2:
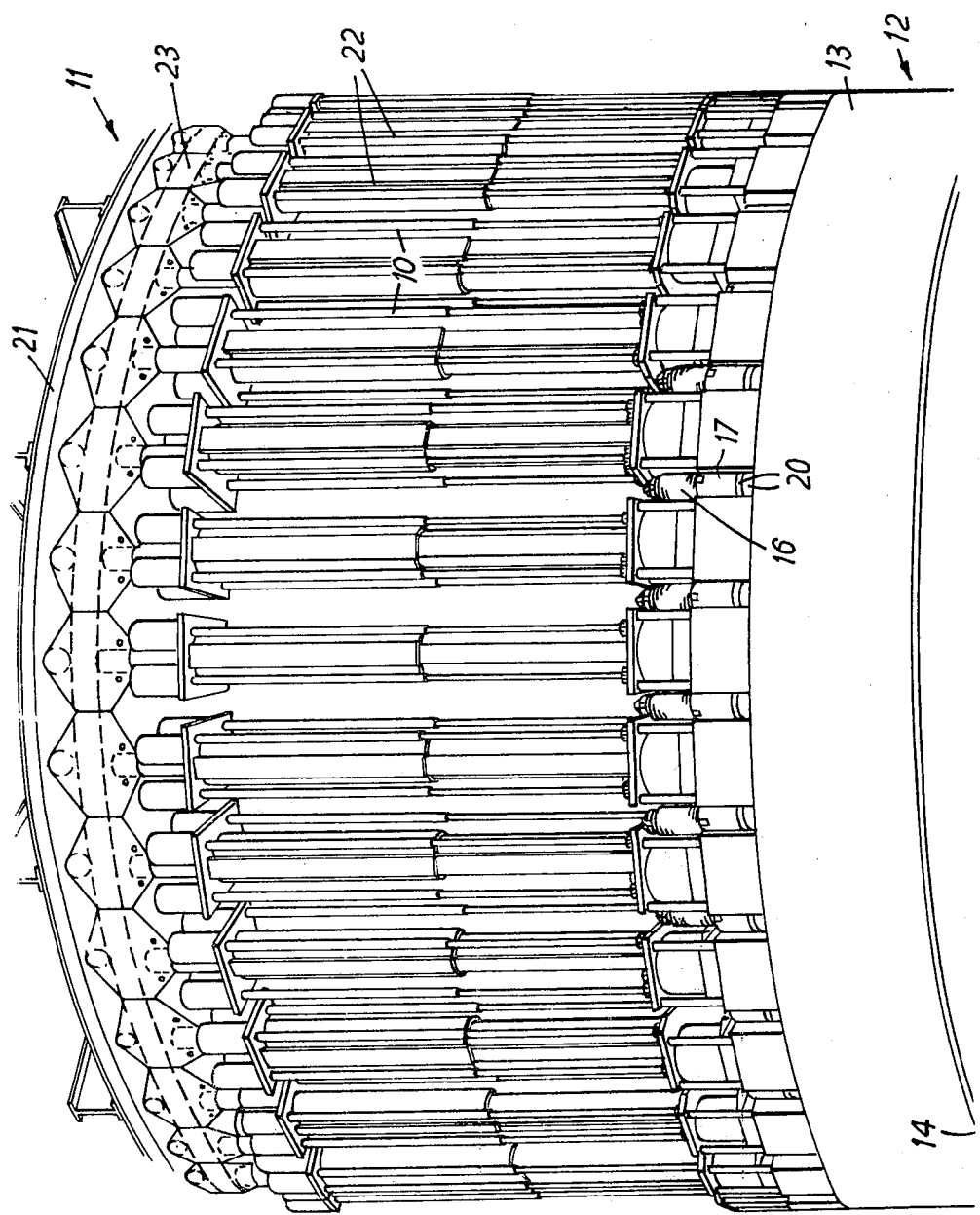
FIG. 2 shows a view similar to FIG. 1 but with the device lowered onto the vessel.
Figure 3:
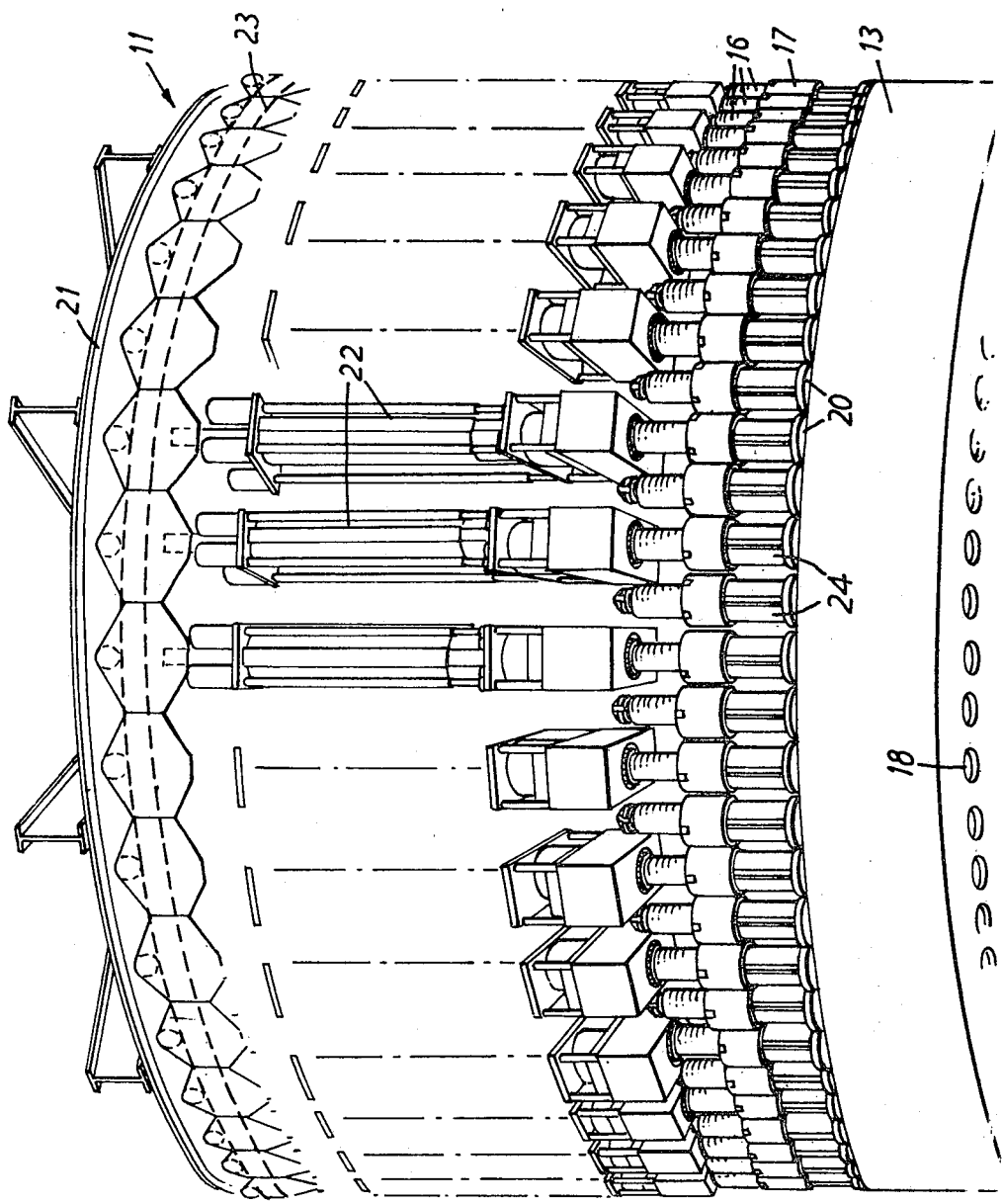
FIG. 3 shows a view similar to FIGS. 1 and 2 but with the cover of the reactor vessel being lifted clear of the vessel.

Referring to FIGS. 1 to 3, these show a multiple stud fastening, tensioning and unfastening device 11 mounted above an atomic reactor pressure vessel 12. The three figures show the device at different stages in the operation of unfastening the studs.

The atomic reactor pressure vessel includes a cover 13 which is secured to a flange 14 around the top of the body of the pressure vessel by means of sixty screw-threaded studs 16 and nuts 17. The studs pass through closely spaced holes 18 in the periphery of the cover and engage screw-threaded bores 19 (see FIG. 4) in the flange 14. The nuts 17 are tightened on the studs to clamp the cover 13 against the flange 14. Pairs of spherical washers 20 are placed under the nut 17.

The device 11 comprises an annular working platform 21 mounted over the reactor vessel and carrying thirty individual nut manipulating devices 22. The working platform together with the thirty manipulating devices can be lowered onto three locating dowel pins (not shown) on the reactor vessel.

The devices 22 are movable in unison on a horizontal circumferential rail 23 mounted below the platform 24 between positions set by stops (not shown). When the manipulating devices are set against the clockwise stops they are positioned above one set of alternate studs 16 and when they are set against the anticlockwise stops they are positioned over the other set of alternate studs. In this way the manipulating devices can be used for simultaneously operating on half the studs and then moved and used to operate on the other half of the studs. It will be appreciated that arrangements in which other sub-multiples of the number of studs are used for the number of manipulating devices are possible, the corresponding fraction of the studs being operated upon each position.

FIG. 1 shows the devices in position prior to being lowered onto one set of studs and nuts. FIG. 2 shows the devices during slackening the nuts and unfastening the studs of one set and FIG. 3 shows the cover being lifted clear of the flange with all the studs and nuts supported on longitudinally split hinged collars 24.

FIG. 4 shows two of the manipulating devices in greater detail. For the purposes of illustration one is viewed from a position at right angles to the other and one is shown in a retracted condition whereas the other is in the extended position. It will be appreciated that in practice the manipulating devices have the same orientation relative to the adjacent part of the platform and that they move in unison so that all are extended and retracted together.

Figure 7:
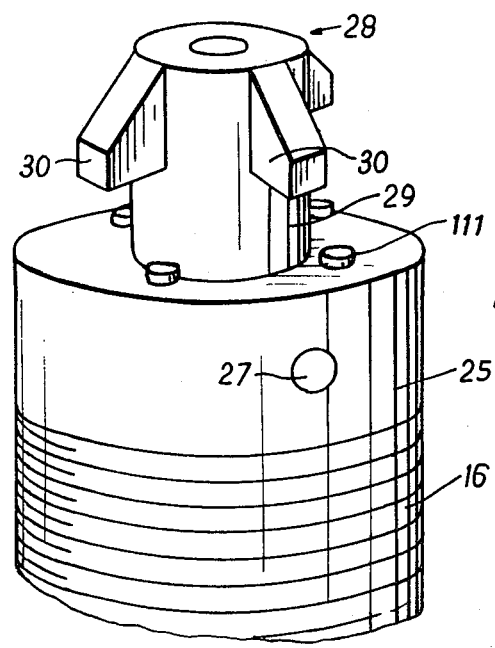
FIG. 7 shows a perspective view of a stud end fitting of the engaging means of FIGS. 5 and 6.
Figure 8:
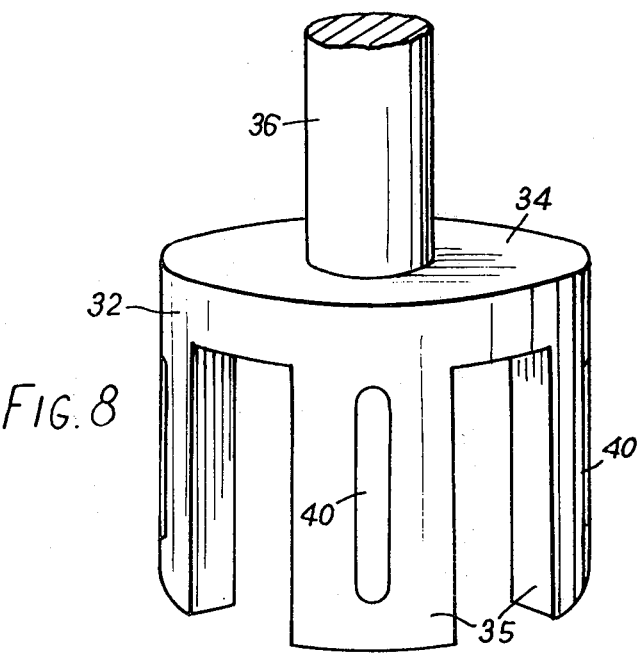
FIG. 8 shows a perspective view of a key member of the engaging means of FIGS. 5 and 6.
Figure 9:
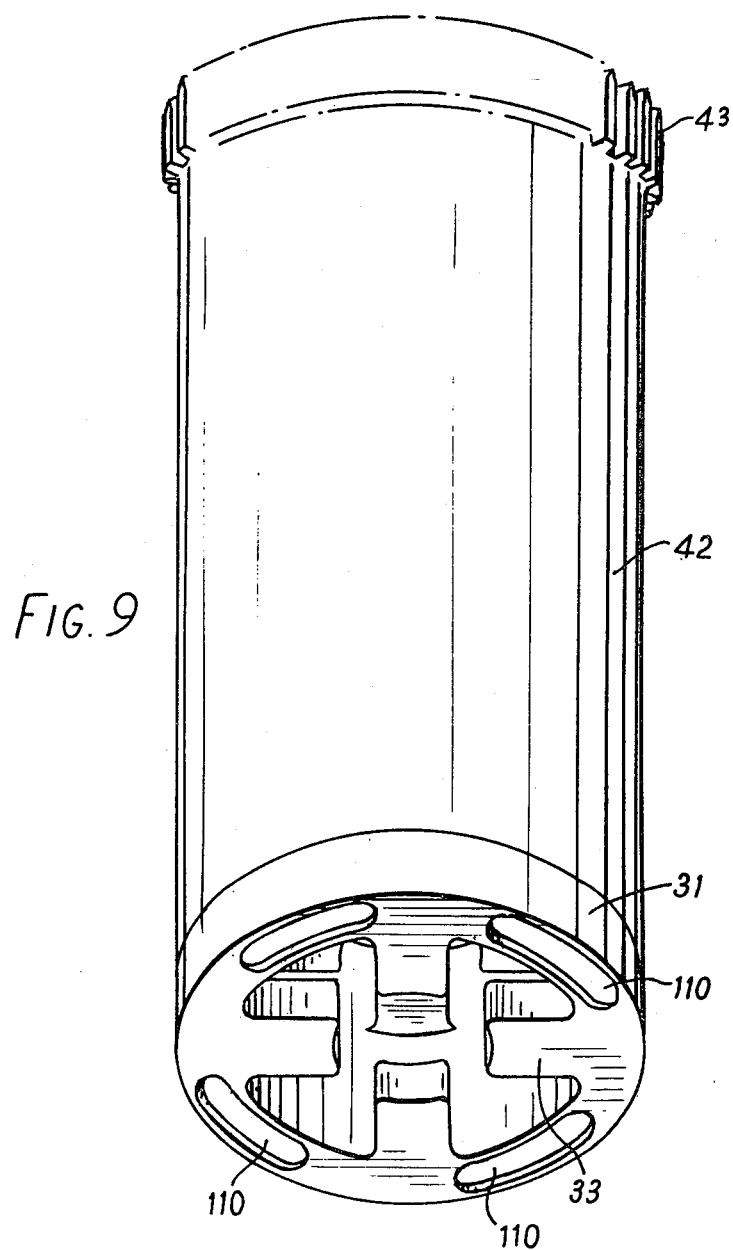
FIG. 9 shows a perspective view from below of a tubular member of the stud-engaging means of FIGS. 5 and 6.

As can be seen in FIG. 4 the upper end of the stud is provided with a fitting 25. This fitting co-operates with a stud-engaging part of the manipulating device to form a dog clutch mechanism 26 which, when engaged, interlocks the stud engaging parts of the manipulating device and the stud against relative axial and the rotational movement. The stud-engaging part and the stud are shown in FIGS. 5, 6, 7, 8 and 9 of which FIGS. 5 and 6 show them in the locked and unlocked condition respectively. FIG. 7 shows the stud fitting and FIGS. 8 and 9 show the other parts of the clutch mechanism.

The fitting 25 at the upper end of the stud may be a separate fitting secured to the stud by a cross pin 27 as shown in the drawings or otherwise, or it may be an integral fitting machined onto the top of the stud. It comprises a splined head 28 of cross-shaped transverse cross section with an undercut 29 below the head. The fitting thus provided four equally circumferentially spaced radially-outwardly projecting lugs 30 with downwardly sloping upper surfaces and radial lower surfaces. The undercut 29 provides an annular space below the lugs 30.

The parts of the manipulator device which comprise the stud-engaging parts or dog clutch are a tubular claw coupling member 31 and a locking plate or key member 32. The claw coupling member comprises an annular wall with four equally circumferentially spaced radially inwardly projecting lugs 33. The spaces between the lugs 33 are large enough to receive the lugs 30 of the fitting 25 on the stud. The axial thickness of the lugs 33 is less than the axial length of the annular clearance space below the lugs 30 provided by the undercut 29 so that after the lugs 33 and 30 have been slid past each other the lugs 33 can be brought behind the lugs 30 by turning the claw coupling member 31 through 45° in the manner of a bayonet fitting. The claw coupling member and the fitting 25 can then be locked in this position by lowering the locking plate or key member 32.

The locking plate 32 comprises a base 34 from which four axially extending fingers or lugs 35 project downwardly. The fingers 35 fit into the axially aligned spaced between the lugs 33 and the lugs 30 so as to key the claw-coupling member to the fitting 25.

As shown in FIGS. 7 and 9, four pins 111 are provided on the upper side of the stud fitting 25 and four complementary arcuate slots 110 are provided in the underside of the claw coupling member 31. The slots each subtend an angle of about 45° at the axis of the tubular claw coupling member. The pins 111 engage the slots 110 when the claw coupling member is lowered into position on the stud so as to limit the relative rotational movement of the claw coupling member on the one hand at the points at which the spaces between lugs 30 and the spaces between lugs 31 are axially aligned and on the other hand at the point at which the lugs 31 are aligned with the spaces between the lugs 30. In this way engagement of the locking plate and disengagement of the claw coupling member from the stud are facilitated.

The locking plate 32 is carried at the lower end of a guide tube 36 extending centrally down the manipulating device. The upper end of the tube 36 is secured to a cross-head plate 37 (see FIG. 4) which is movable vertically by means of two hydraulic actuators 38 connected between the cross-head plate and the top plate 39 of the manipulating device.

The locking plate is coupled to the claw coupling member 31 by an axial lost-motion coupling formed by axial slots 40 in the fingers of the locking plate 32 which receive pins 41 fixed in the upper part of the annular wall of the tubular claw coupling member. The movement of the pins 41 up the slots 40 allows limited relative axial movement of the claw coupling member and the locking plate.

When the actuators 38 are retracted the cross-head plate, the guide tube, the locking plate and the claw coupling member are lowered onto the fitting 25. The lugs 33 pass down through the spaces between the lugs 30. The claw coupling is rotated through 45° to bring the lugs 33 beneath the lugs 30 while the locking plate 32 still remains above the end fitting, the pins 41 being at the lower ends of the slots 40. The locking plate is then lowered to bring the fingers 35 between the lugs 33 and 30 keeping them together as the pins 41 move up the slots 40.

As can be seen in FIG. 9 a cylindrical drive tube 42 is secured to the top of the claw coupling 31 and this tube carries at its upper end, around its outside, gear teeth 43. The gear teeth 43 and the drive tube 42 form part of the stud rotating mechanism that will be described below.

Figure 10:
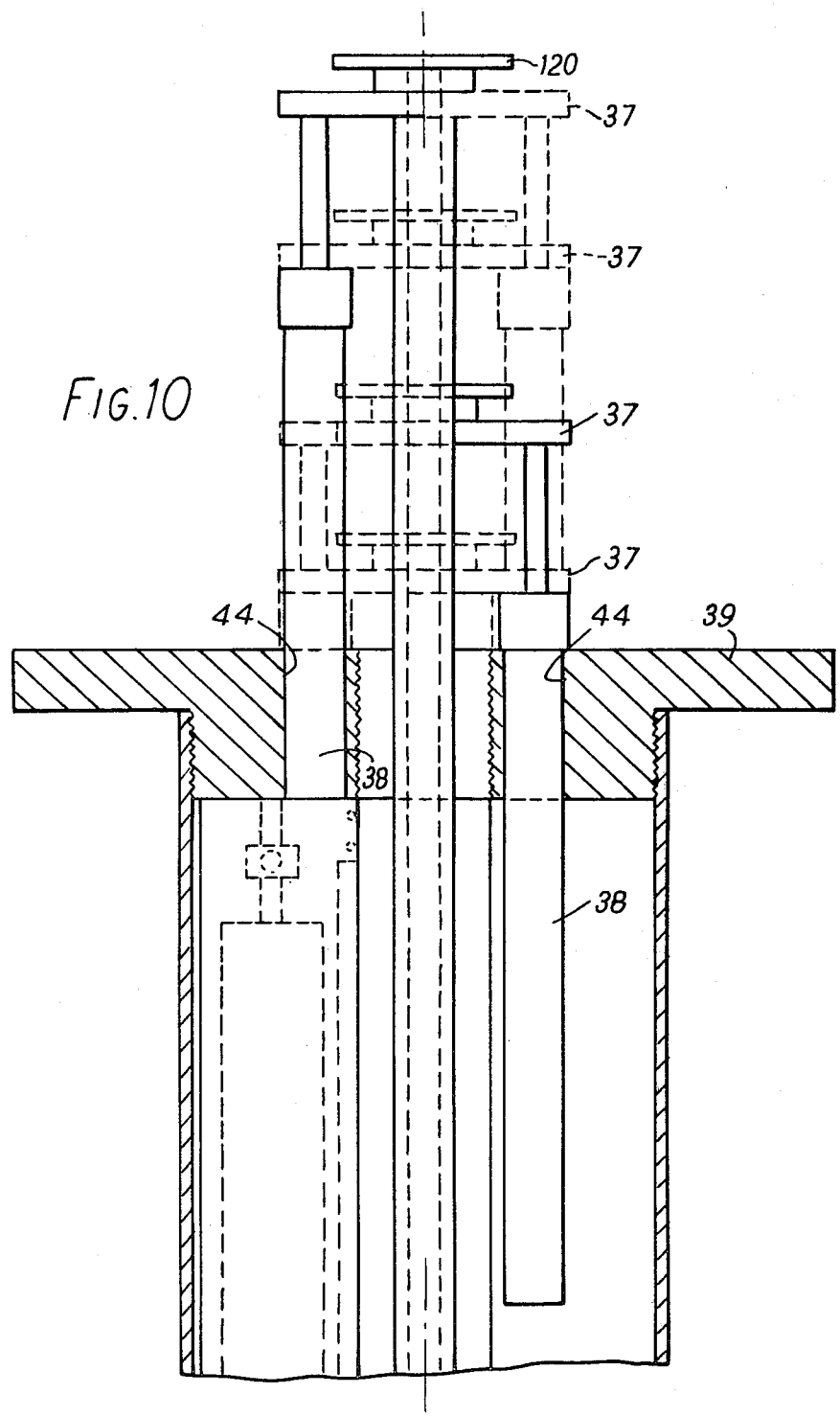
FIG. 10 shows in elevation an actuator of the means for raising and lowering the stud-engaging means of FIGS. 5 and 6.
Figure 11:
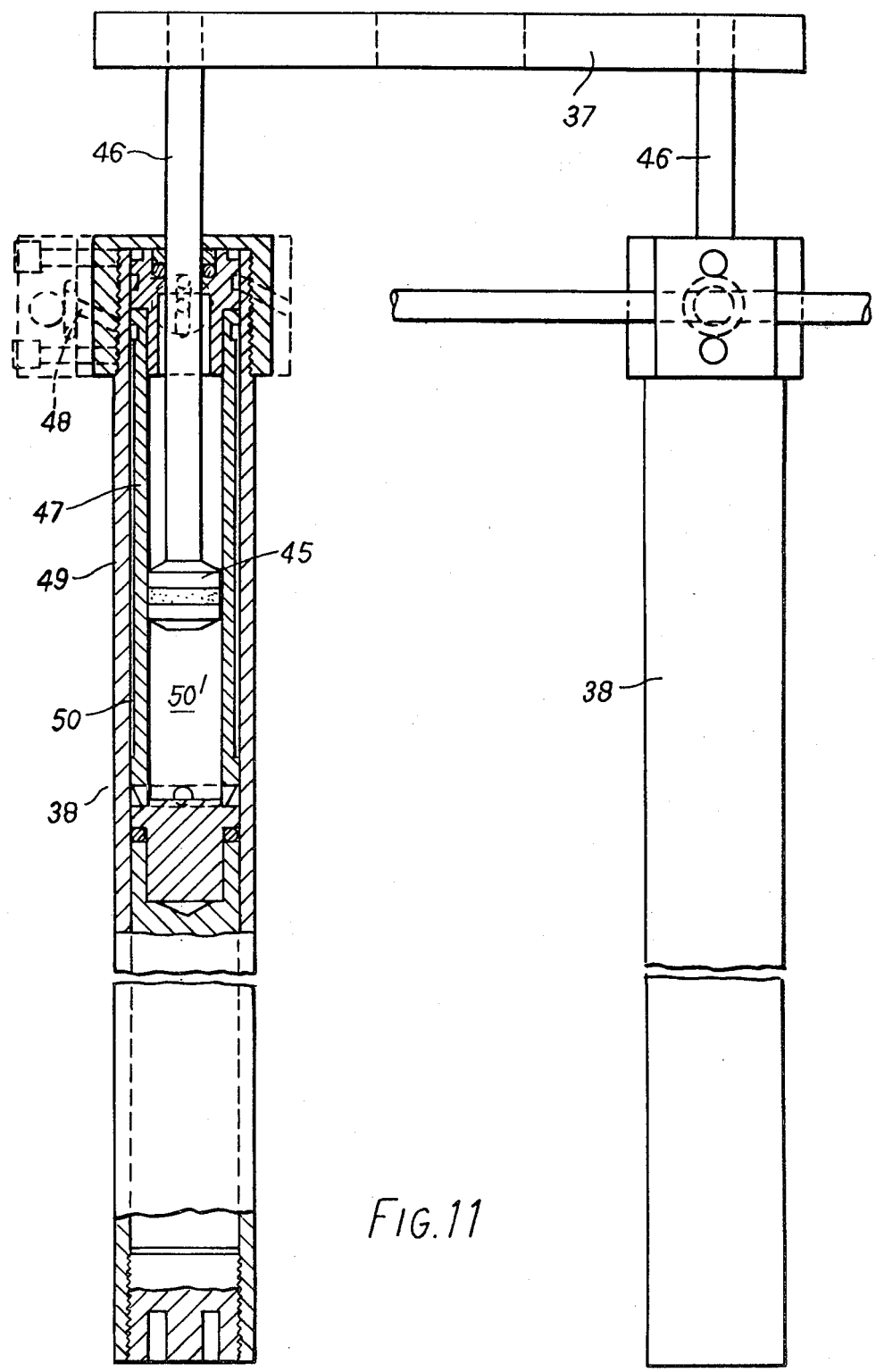
FIG. 11 shows an enlarged elevation, partly in section of the actuator of FIG. 10.

FIG. 10 shows details of the top plate 39 and the actuators for the stud-engaging parts whilst FIG. 11 shows the actuators in greater detail.

The actuators 38 are fitted in holes 44 in the top plate and comprise pistons 45 with piston rods 46 secured to the cross-head plate 37. The pistons move in cylinders 47 which are supplied with hydraulic fluid through hydraulic pipe couplings 48. When the pressure in the cylinders is low the pistons descend under the weight of the cross-head block 37 and the parts carried by the cross-head block. When the actuators are pressurised hydraulic fluid flows through the pipe coupling 48, down the space between the cylinders 47 and an outer sleeve 49 in grooves 50 provided for this purpose and into the spaces below the pistons 50. The pressure raises the pistons 45 and with them the cross-head piece and the stud engaging parts.

Figure 12:
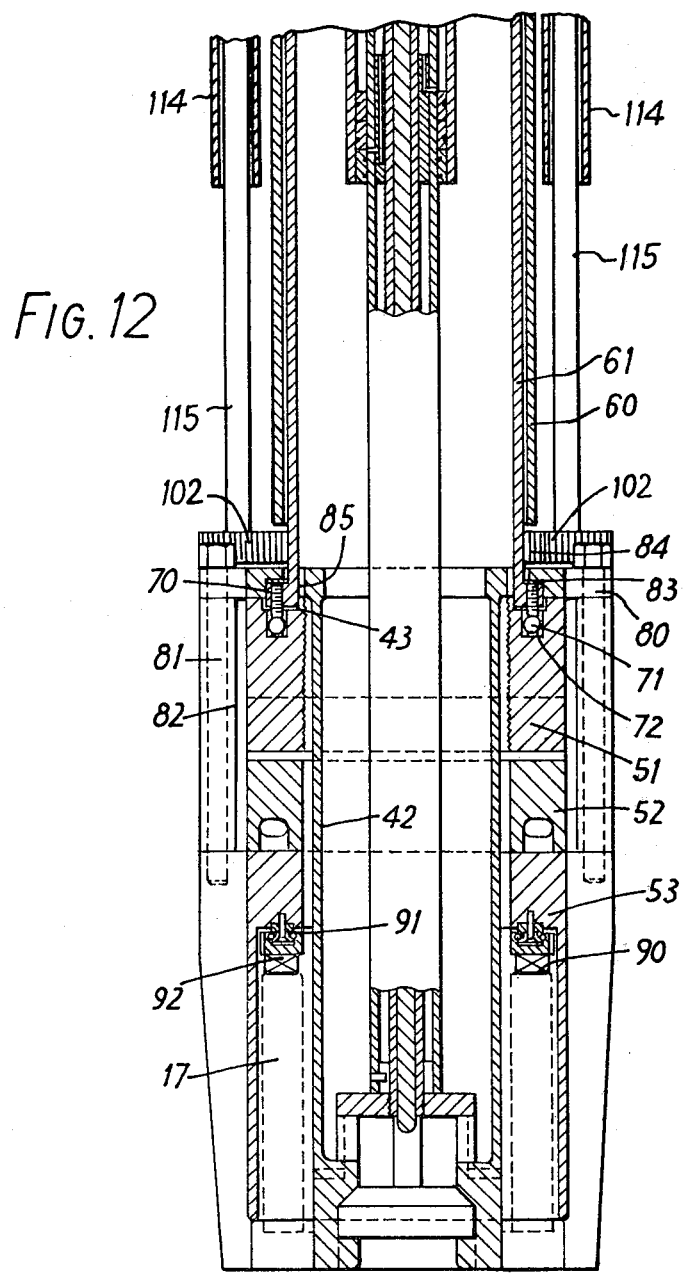
FIG. 12 shows on an enlarged scale in vertical section, the lower part of the manipulating device of FIG. 4.
Figure 13:
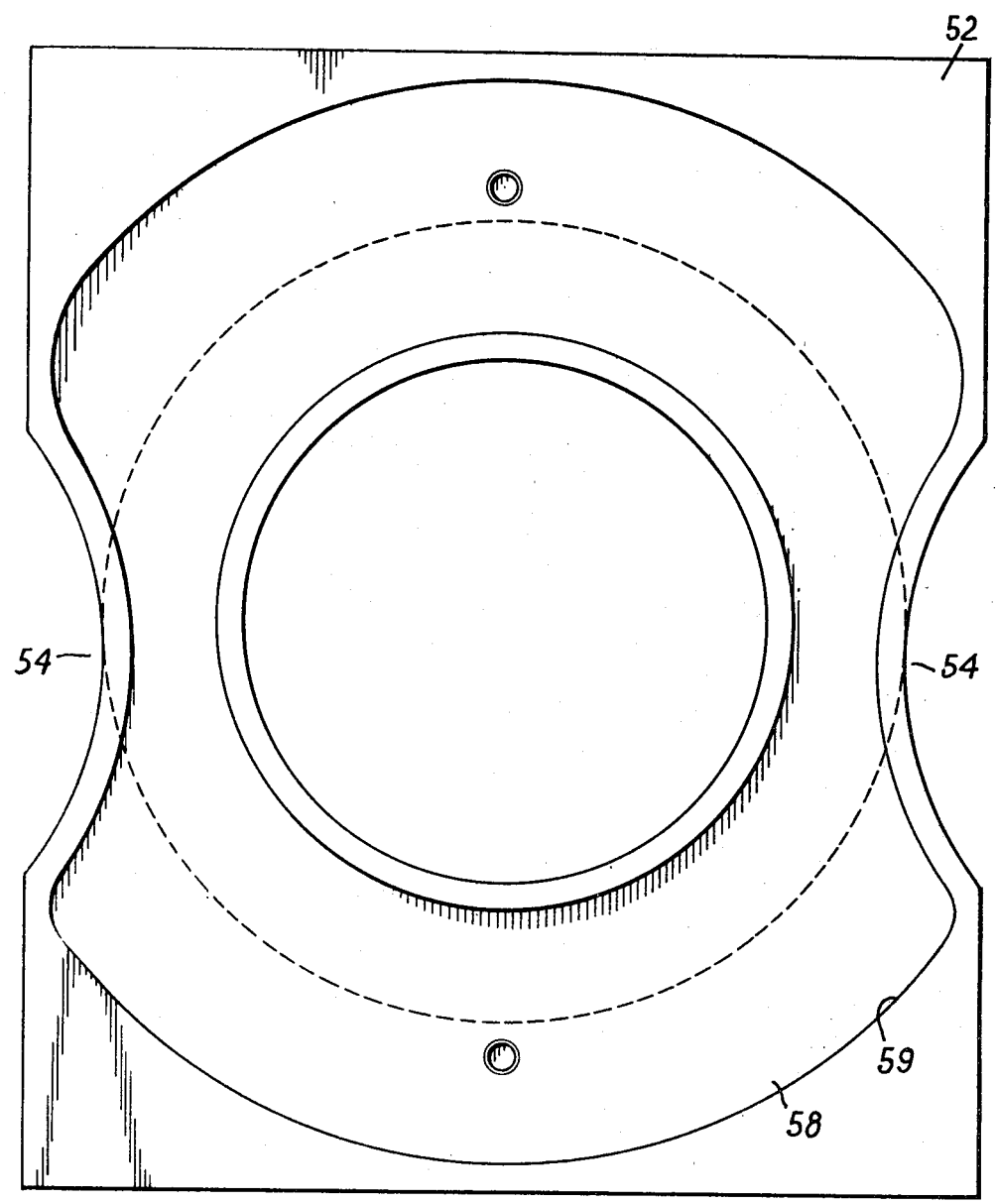
FIG. 13 shows in plan view on an enlarged scale the hydraulic pressure member of the manipulating device of FIG. 4.
Figure 14:
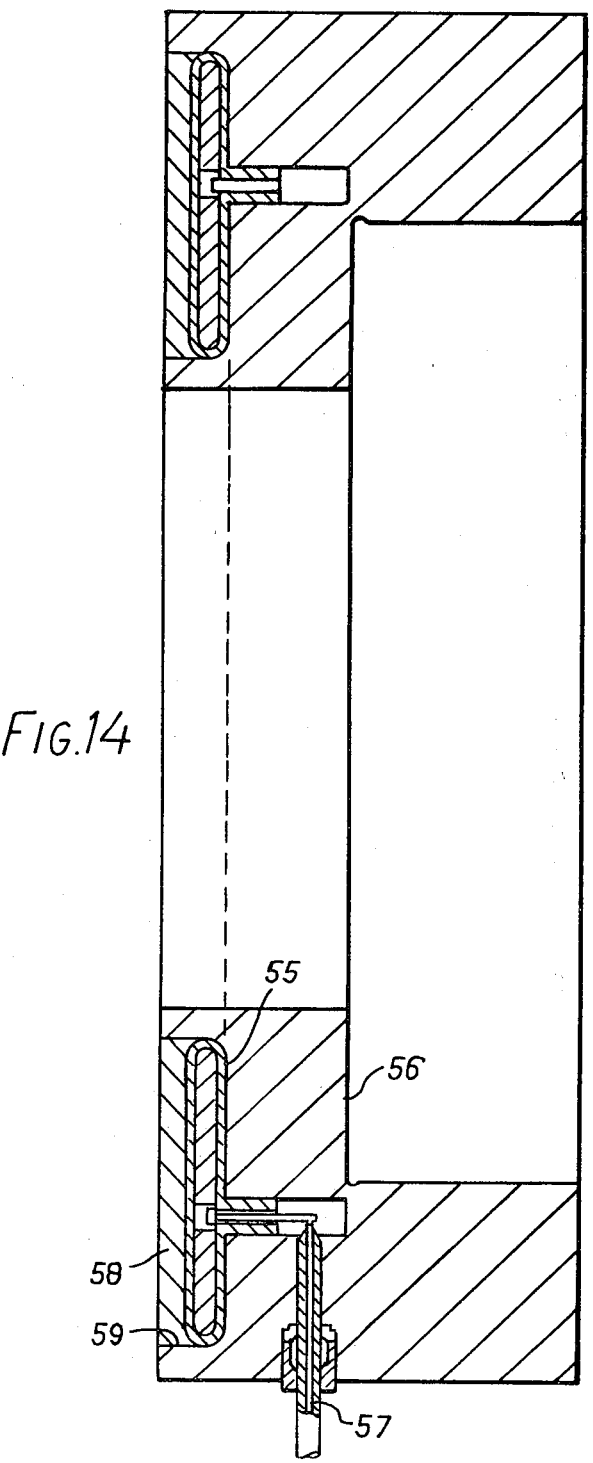
FIG. 14 shows a vertical section through the hydraulic pressure member of FIG. 13.

Referring now to FIG. 4, and 12 the manipulating device includes a top nut 51 which can be screwed onto the end of the stud, and a hydraulic pressure member or load cell 52 of the type described in our Patent Application No. 4284/77 (German OLS No. 2804313.2) which is located between the top nut and a skirt or stool 53 which can be lowered around the working nut 17 to rest on the cover 13. These parts are all shown in greater detail in FIG. 12 and the hydraulic load cell is shown in FIGS. 13 and 14. The hydraulic load cell differs from that shown in FIGS. 1 and 2 of the abovementioned application principally in that arcuate recesses 54 are provided in the sides of the body to provide clearance for the adjacent studs and their nuts with the load cell 55 being modified accordingly. With the top nut screwed down against the upper surface 56 of the load cell 52, the load cell can be pressured with hydraulic fluid through a filling bore 57 so that the annular piston 58 is forced out of the groove 59 against the top of the stool 53 thus tensioning the stud and allowing the working nut 17 to be turned.

Referring now to FIG. 15 which shows the upper part of the manipulating device in greater detail, two cylindrical tubes 60 and 61 are fitted together in a telescopic manner. The upper end of the upper tube 60 is fixed to the top plate 39. The lower tube 61 fits inside the tube 60 and is free to slide up and down and to rotate inside the tube 60.

A thrust bearing 62 couples the upper end of the lower tube 61 to a cylinder 63 which together with an annular piston 64 forms the movable member of a hydraulic actuator 65. The piston 64 carried by the cylinder 63 forms a sliding seal against a tube 66. The lower end of the space 67 between the cylinders 63 an the tube 66 is closed by sliding seals 68 carried by the inner tube 66 and an end sliding seal 69 is provided on the cylinder 63 and bears against the tube 66. The cylinder 66 is fixed to the top plate and accommodates the guide tube 36.

The space 67 is connected to a source of hydraulic fluid by means of conduits contained within the annular space between tube 66 and guide tube 36. These conduits emerge as 112 and 113. Pressure applied at 112 will retract the actuator into the position shown in the drawing. Bleeding off pressure at 112 will allow the actuator to lower under the weight of the stool 53 the top nut 51 and the load cell 52. Alternatively the actuator can be powered into the fully extended position by pressurizing at 112.

Referring again to FIG. 12, this shows that the lower end of the tube 61 is attached to an outwardly-turned flange 70 which carries a circle of downwardly-projecting rubber-covered pegs 71. The pegs 71 are received in a ring of matching bores 72 in the upper surface of the top nut as can be seen more clearly in FIG. 16. The pegs and the bores provide a torque transmitting coupling between the tube 61 and the top nut 51.

The assembly of the tube 61 and the top nut 51 is free to rotate relative to the tube 60 and the lower part of the manipulating device. The drive means for rotating the top nut will be described below.

The lower end of the manipulator includes a base plate 80 which is fastened by bolts 81 and spacers 82 to the skirt 53. The base plate has a central hole through which the tube 61 passes with clearance. An annular rebate around the lower edge of the central hole accommodates the flange 70 of the tube 61. A thrust bearing surface 83 is provided between the flange 70 and the overhanging part around the edge of the hole. Gear teeth 84 are provided on the outside of the tube 61 above the base plate 80 for meshing with a pair of pinions 102 on the top of the base plate 80. The pinions 102 serve for rotating the tube 61 and in turn rotating the top nut 51.

On the inside of the tube 61 are a second set of gear teeth 85. When the tube 61 and the drive tube 42 are in the relative positions shown in FIG. 12 the teeth 85 engage the teeth 43 to provide a splined coupling between the tube 61 and the tube 42. This occurs when the tube 61 is in a raised position and the tube 42 is in a lowered position. Thus when the tube 61 is raised rotation of the tube 61 not only rotates the top nut but also the claw coupling member and thus, when engaged with the end fitting 25, the stud 16.

Lowering of the tube 61 causes the teeth 85 and 43 to become disengaged and in this condition rotation of the tube 61 rotates only the nut 51.

Figure 18:
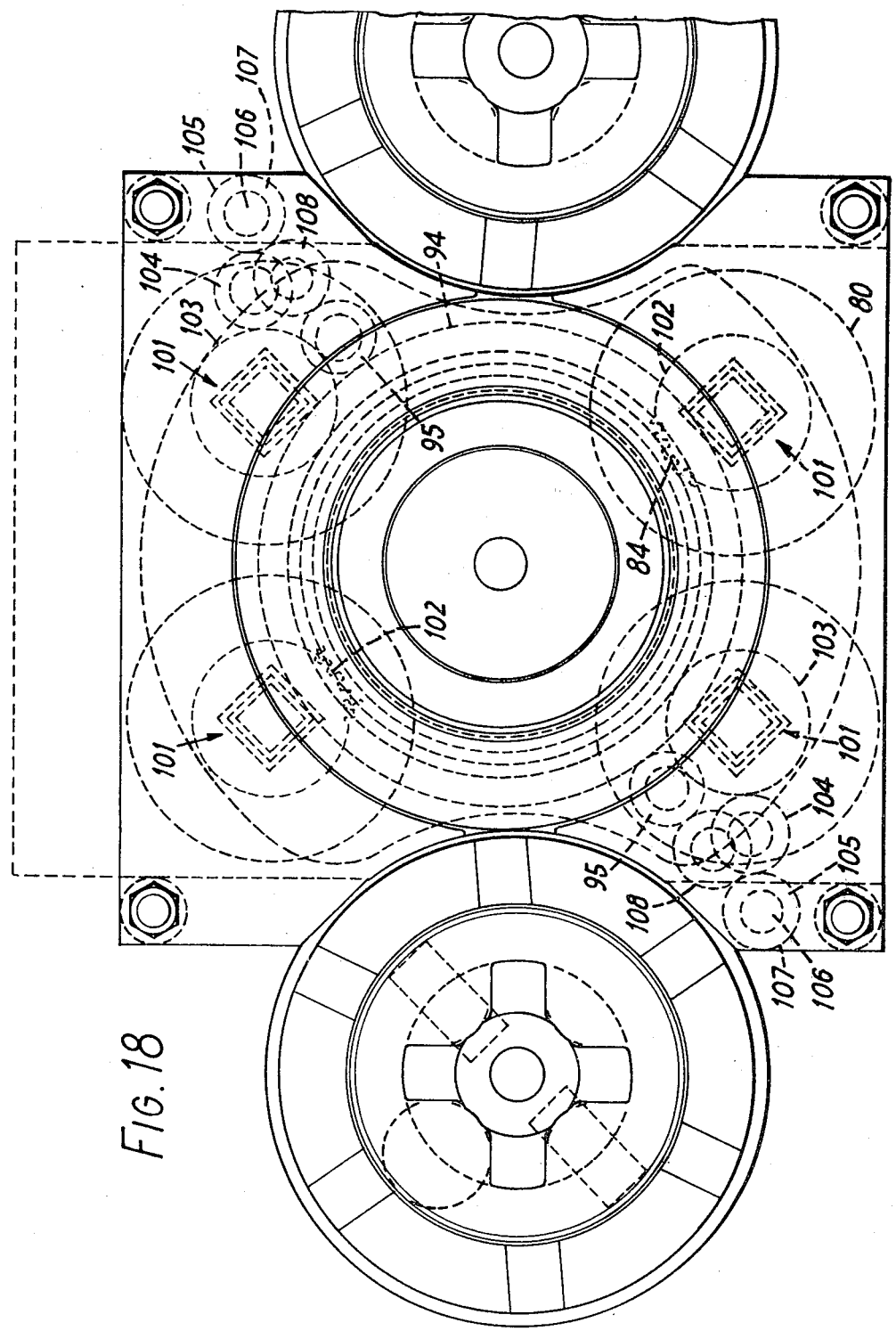
FIG. 18 shows in plan view the lower part of the manipulator of FIG. 4 with parts of the drive means for the top nut and the working nut.
Figure 19:
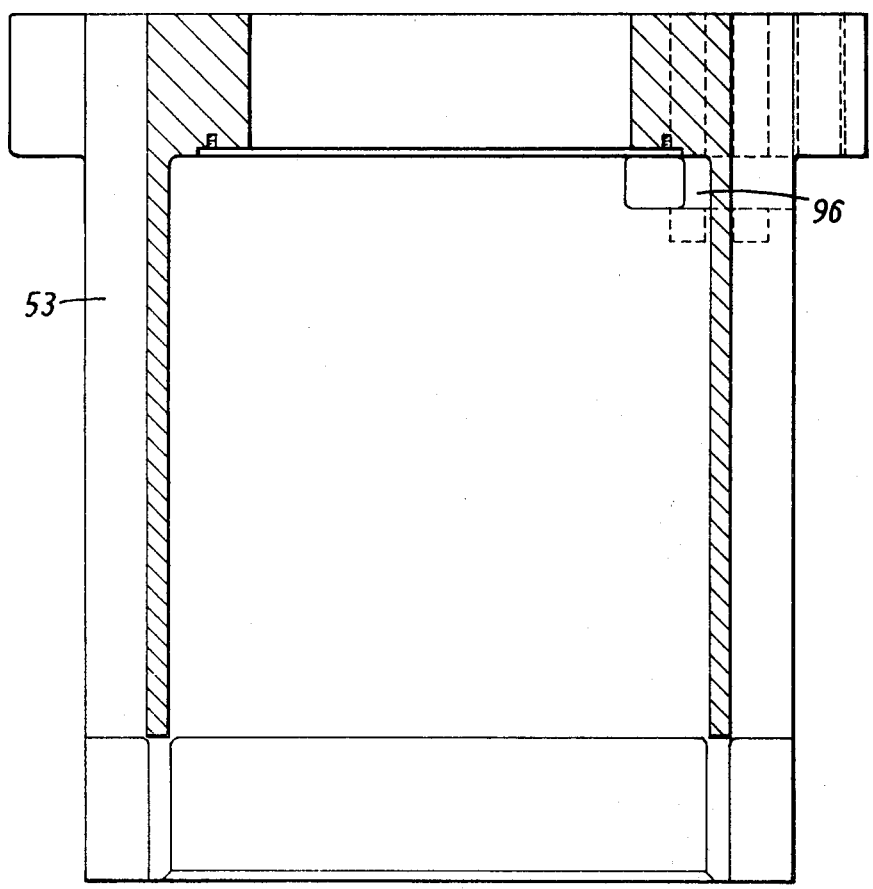
FIG. 19 shows in vertical section a stool of the lower part shown in FIG. 12.

The upper end of the working nut 17 is provided with a series of regularly-spaced rectangular recesses 90 (see FIG. 12) which gives the nut a castellated appearance. Carried inside the skirt 53 on bearing 91 is a working nut engaging a ring 92 with dogs 93 that are engageable in the recesses 90 in the working nut 17. The bearings 91 permit ring to rotate relative to the skirt and at the same time are designed to retain the ring 92 in position on the skirt. FIG. 17 shows the ring in greater detail. Around the outside of the ring 92, gear teeth 94 are provided. These teeth mesh with two pinions 95 located in slots 96 in the side of the skirt (see FIGS. 18 and 19). Rotation of the pinions 95 causes the ring 92 to rotate and thus, when the dogs 93 are engaged with the recesses 90 in the lower nut 17, causes the lower nut to rotate.

Figure 20:
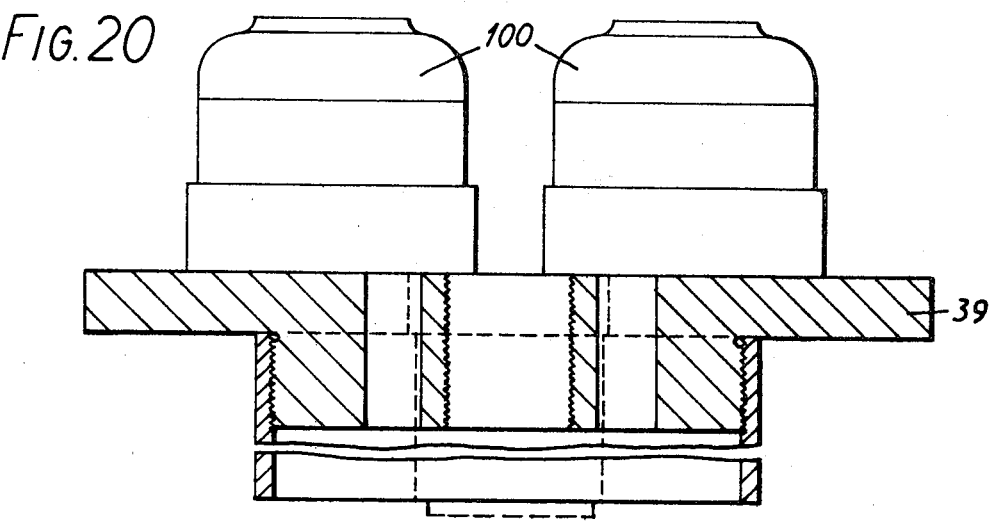
FIG. 20 shows, partly in section, an elevation of the drive motors of the manipulating device of FIG. 4.
Figure 21:
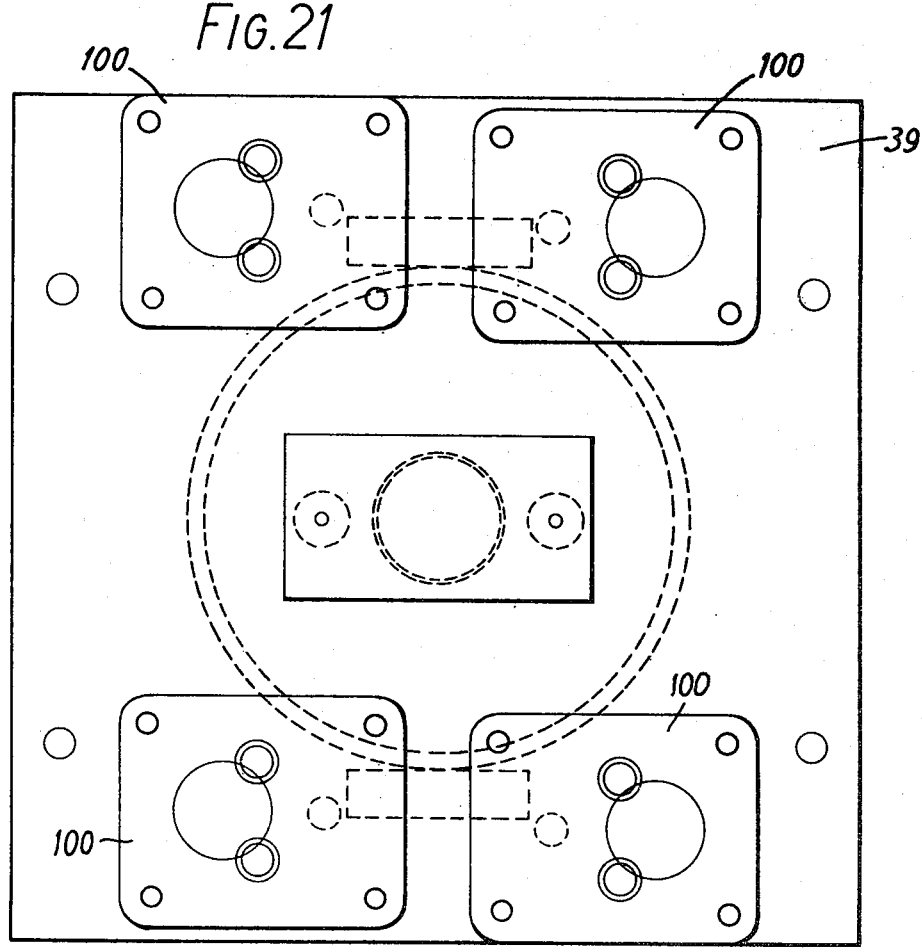
FIG. 21 shows in plan view the drive motors of the manipulating device of FIG. 4.

For rotating the top and working nuts four hydraulic motors 100 are mounted on the top plate 39 around the central opening that is provided for the guide tube 36. FIGS. 20 and 21 show these motors. The drive shafts from the motors pass through holes in the top plate end are coupled to respective telescopic drive shafts 101. Each drive shaft comprises a square-section tube 114 as the upper part and a square section rod 115 as the lower part which is a sliding fit in the upper part.

At their lower ends one diagonally opposite pair of drive shafts is fixed to the pair of pinions 102 (see FIGS. 12 and 18) mounted for rotation on top of the base plate 80 and meshing with the gear teeth on the outside of the tube 61 for turning the top nut 51 and, selectively, the stud 16.

The other diagonally opposite pair of shafts 101 are fixed to pinions 103 mounted for rotation on top of the base plate 80 which mesh with a gear train terminating in the pinions 95 which turn the ring 92 and thus the lower nut 17. The gear train comprises gears 104 and 105 on top of the base plate, drive shafts 106 on which gears 105 and gears 107 are fixed and meshing gears 107, 108 and 95 mounted in the slots 96 in the skirt.

The procedure for removing studs is as follows. The working platform 21 is lowered onto the locating dowels on the service structure. The power mains (115 volts a.c. single phase) and high and low pressure links (high for the load cell and low for the other hydraulics) are connected to the electrical and hydraulic ring mains on the working platform. The controls for these supplies are situated in a control station remote from the reactor vessel. The low pressure hydraulic supply is raised to 500 p.s.i. which causes the actuator 65 to raise the tube 61 and the actuator 38 to raise the guide tube 36 so that all the stud manipulating devices are in the retracted condition. These are then set aginat the clockwise stops to position them over one set of alternate studs.

The first operation is to release the pressure in the load cells 52 in about a minute. When all the nuts are home the motors are automatically reversed to screw back each top nut by one commmplete turn. The load cells are then pressurised to the original tightening pressure of the stud. The working nut drive mechanisms are then operated to unscrew all working nuts 17 one turn. This is effected by energising the appropriate pairs of hydraulic motors 100 which, operating through the pinions 103, 104 and 105, drive shafts 106 and pinions 107, 108 and 109 turn the rings 92 which, engages by their dogs 93 the working nuts 17.

This achieved, the load cell pressure is released and the tension on the nut will have been reduced sufficiently for the studs to be turned by the stud rotator mechanism. Firstly however with the pressure in the actuator 65 maintained at 120 p.s.i. the top nuts are unscrewed. The actuator 65 is then pressurised to 500 p.s.i. to raise the tube 61 so that the teeth 85 engage the teeth 45 on the outside of the tube 42. With these teeth engaged rotation of the top nut rotating mechanism also rotates the drive tube and hence the claw coupling mechanism. The actuators 65 draw up the studs as they are unscrewed some 8" into the cover 13 to clear the flange 14.

The hinged split sleeves 24 are lowered by hand using light tubular manipulators (not shown) to close around the 8" length of exposed stud between the underside of the nut 17 and the spherical washers. The actuators are lowered so that the weight of the lower nut and stud are taken by the split sleeve.

The stud engaging parts are then freed from the stud by raising the guide tube 36 while rotating the claw coupling. The stud manipulators are raised a further 3" to be clear of the stud ends.

All manipulators are then swung against the anti-clockwise stops and the operation is repeated on the the covers are removed before the studs are refitted. To eliminate this time consuming practice the stud holes may be flooded to a depth say ¼" below the surface of this joint with a non-corrosive liquid. A high gravity quiescent water repellent fluid is suitable for this purpose. The fluid is injected into the bores through a manifold 117 (see FIG. 4) and connecting branches drilled in the flange 14. Overflow branches and manifold (not shown) are provided ¼" below the top of the bore to prevent the fluid overflowing the bore. Complete draining of this fluid through the manifold 117 will be provided before the studs are screwed in. The fluid leaves the bores clean, lubricated and prevents corrosion. The manifold may be formed in three sections, each serving 20 bores to prevent too large a pressure variation in the fluid delivered to different bores.

I claim:

1. A stud manipulating device for inserting a stud into a bore in a workpiece, tensioning the stud, tightening a working nut on the stud, or for slackening the nut on the stud and removing the stud from the workpiece, the device comprising means for engaging the working nut and interlocking with the nut against relative rotational movement, first drive means coupled to the working-nut engaging means and operable in use to rotate the working nut, a top nut for securing onto the end of the stud, second drive means operable to rotate the top nut, means for raising and lowering the top nut, a hydraulic pressure member located between the top nut and the workpiece and operable to tension the stud by means of the top nut, stud engaging means engagable with the stud to interlock with the stud against relative rotational movement, means for raising and lowering the stud-engaging means, and clutch means operable between the second drive means and the stud engaging means and which is engaged when the top nut is in a raised position and the stud-engaging means is in a lowered position, to couple the stud engaging means in rotation with the second drive means.

2. A device according to claim 2 in which the stud engaging means is adapted to engage an upper end portion on the stud which has circumferentially-spaced radially outwardly projecting lugs with an annular space beneath them, and the stud engaging means comprises a tubular member with circumferentially-spaced radially inwardly projecting lugs which can pass between the radially outwardly projecting lugs on the end portion of the stud and can be rotated in the annular space into a locking position in which they are located below the outwardly projecting lugs, and a key member with circumferentially-spaced axially downwardly projecting lugs which can enter the aligned spaces between the radially outwardly projecting lugs and the radially inwardly projecting lugs when the lugs are in the locking position, to lock the tubular member to the end portion of the stud against relative axial and rotational movement.

3. A device according to claim 2 in which the key member is fixed to the tubular member so as to permit limited relative axial movement, the axially projecting lugs being aligned with the spaces between the radially inwardly projecting lugs.

4. A device according to claim 1 in which the stud-engaging means serves as a guide for lowering the top onto the stud.

5. A device according to claim 1 in which the stud engaging means includes a tubular member and the second drive means includes a tubular member coaxial with the tubularly member of the stud engaging means and the clutch means comprises a ring of radial inwardly projecting teeth and a ring radially outwardly projecting teeth on respective ones of the tubular members and which can be brought into engagement by relative axial movement of the tubular members, so as to provide a splined connection between the tubular members.

6. A device according to claim 1 comprising an upper part which carries motors of the first and second drive means and actuators for the raising and lowering means and a lower part which carries the top nut, the pressure member the clutch means and the stud engaging means, and the working nut engaging means, the motors being connected to the working nut engaging means and the top nut by splined telescopic drive shafts and the lower part being connected to the upper part by telescopic guide tubes.

* * * * *